United States Patent Office 3,459,625
Patented Aug. 5, 1969

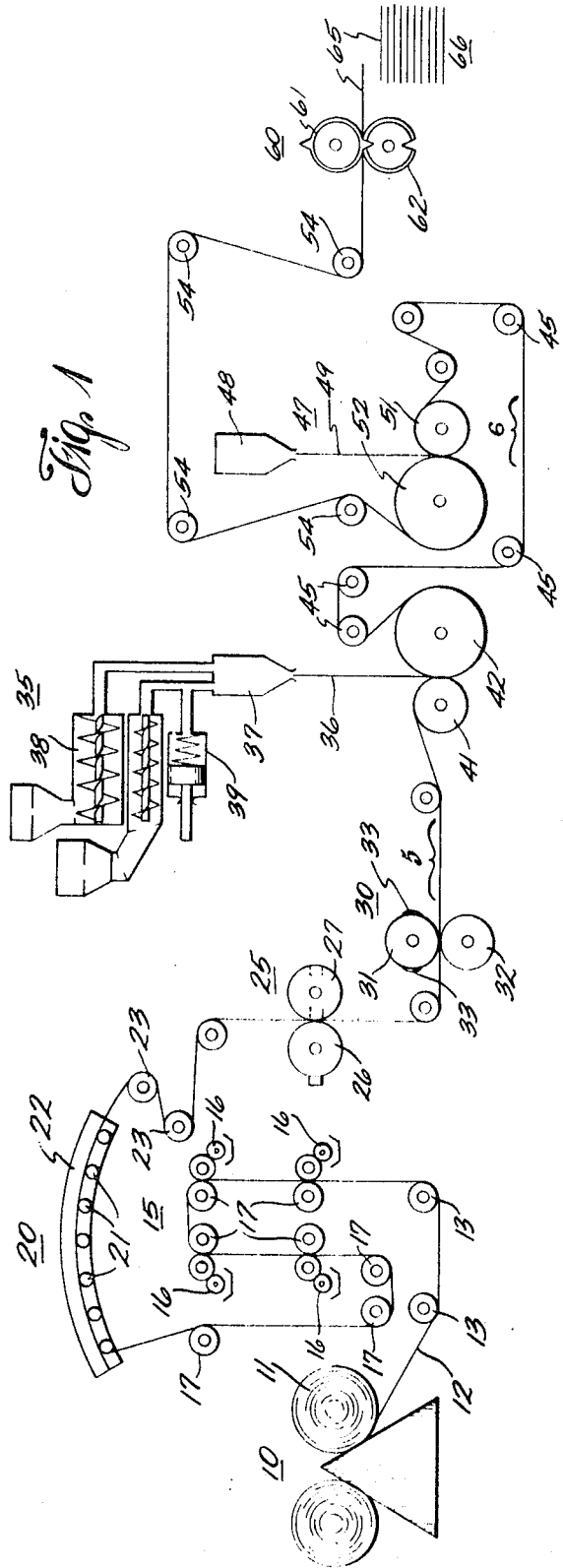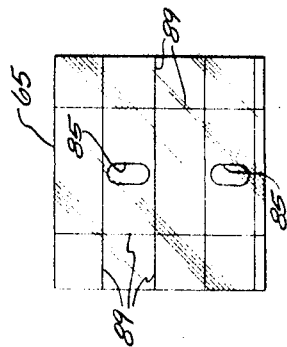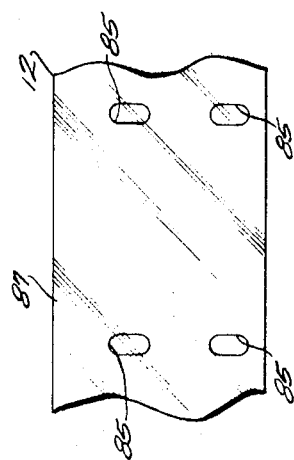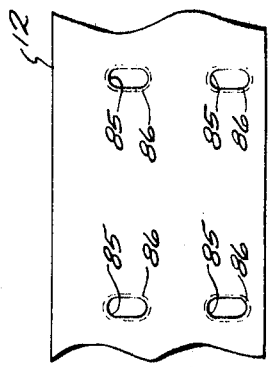

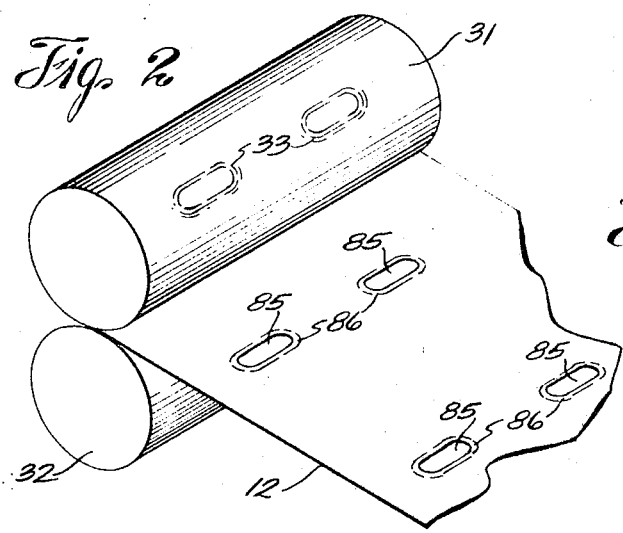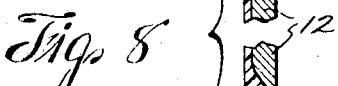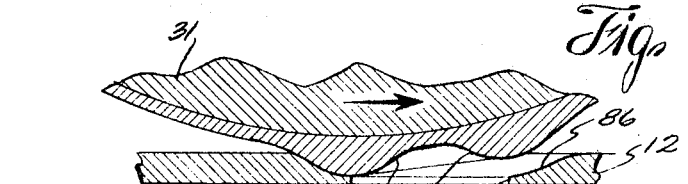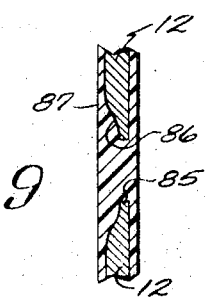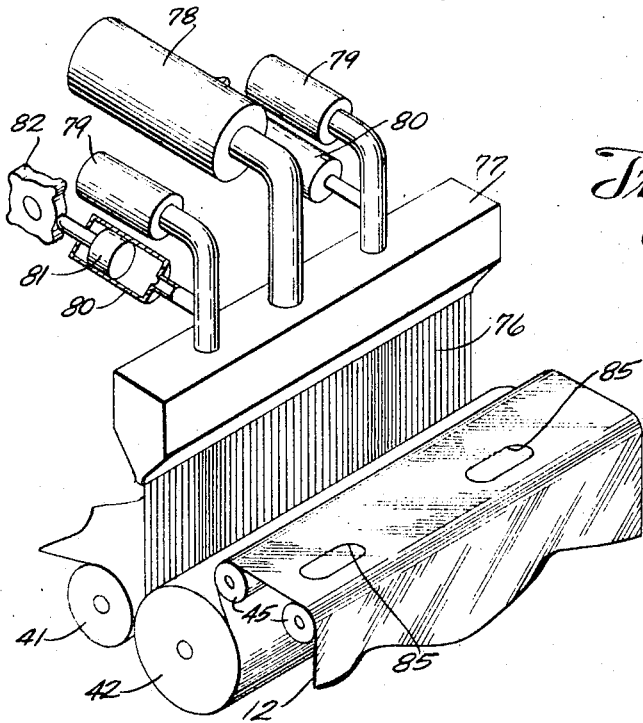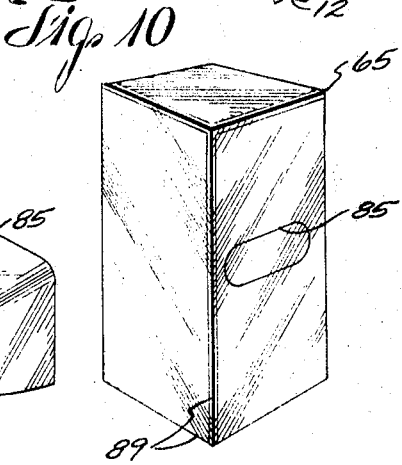

3,459,625
PACKAGING MATERIAL AND THE PRODUCTION THEREOF
William C. Heller, Jr., 1840 N. Farwell Ave., Milwaukee, Wis. 53202, and Donald W. Davis, Milwaukee, Wis.; said Davis assignor to said Heller
Filed Apr. 21, 1966, Ser. No. 544,140
Int. Cl. B32b 3/24, 31/00
U.S. Cl. 161—114          17 Claims

ABSTRACT OF THE DISCLOSURE

This invention is directed towards packaging materials which may be used to form containers. The packaging material is supplied with window openings in the base sheet and a plastic film coating which has a greater thickness in the areas which coat the openings in the base sheet.

---

The present invention relates generally to improvements in the art of packaging, and relates more particularly to the provision and production of paperboard or like containers having window openings therein for viewing the contents.

In the packaging industry, it has become common practice to provide disposable containers for liquids such as milk and juices as well as for a variety of other products, including granular products, for purposes of economy and convenience. Such disposable containers are commonly formed either of sheet materials such as paperboard which is suitably coated, impregnated or otherwise liquid-proofed or of molded plastic. Also, these containers have heretofore been formed either with or without windows or sight openings for viewing the contents.

Plastic containers have recently enjoyed considerable commercial acceptance primarily due to the relatively attractive appearance and variance in designs thereof coupled with the ability to readily render the plastic transparent or translucent in whole or in part. However, the production methods and equipment required for fabricating these plastic containers is expensive and results in undesirably high costs which must be absorbed by the ultimate consumer. In addition, these plastic containers are of a fixed shape and are therefore bulky and incapable of being knocked down or folded, thereby causing shipping and storage problems. Furthermore, the application of printed matter to plastic containers sometimes presents problems, and the production of the containers is undesirably slow.

While the paperboard and laminated containers are capable of being produced rapidly and at relatively low cost with line production methods and machinery and are furthermore readily receptive to printing applied by high speed presses, the paperboard base sheets are opaque and non-transparent and are incapable of being rendered transparent. Therefore, if window or sight openings are desired, they must be specially formed as by diecutting or the like, and the problem of covering the openings with a transparent material while maintaining liquidproofness is then presented.

Although various proposals have heretofore been presented for covering the window openings in paperboard cartons or containers with transparent materials as evidenced by numerous patents, these prior methods and devices have generally been incapable of incorporation in or with existing high speed carton production methods and/or equipment. Also, the cartons or containers previously provided with windows are not generally employed or accepted for various other reasons such as the need for utilizing adhesive or wax sealing in their production, the use of fragile and easily ruptured sheet materials for the window coverings, and the limitations requiring that the use of these prior devices be employed only in set-up or completely assembled cartons thus precluding use thereof in collapsed or knockdown type containers.

It is therefore an important object of the present invention to provide an improved container having window or sight openings therein and possessing excellent protective and leakproof properties, and an improved method of and apparatus for producing the same, which obviate the aforesaid disadvantages and objections of existing devices of this general type.

Another object of this invention is to provide improvements in the production of paperboard or like containers which permit the placement and covering of windows or sight openings in cartons of the collapsible or knockdown type to facilitate shipment and storage thereof.

Another object of the invention is to provide improvements in paperboard cartons or the like which may be readily incorporated by means of high speed production methods and with the aid of relatively simple automated apparatus operating in a continuous manner.

Still another object of this invention is to provide an improved leakproof container which utilizes extrusion coating or other types of coating in the production thereof and which results in extremely attractive and highly efficient final packages having window areas therein and adapted for use in the merchandising of a wide variety of products.

In the copending application of Albert L. James and William C. Heller, Jr., Ser. No. 493,680, now Patent 3,379,102 issued Apr. 23, 1968 a windowed carton is provided in which carton stock which has been precoated with thermoplastic material is subsequently provided with window openings which are then covered by a sheet of thermoplastic material applied to a side of the base sheet and adhered thereto by means of the precoating material. The method disclosed in such copending application is adaptable to and utilizes high speed production methods and equipment and enables the formation of windowed cartons from precoated stock. However, the window covering is effected by means of a separate sheet or sheets which are adapted to be adhered to the coating of the base sheet.

Again, in the copending application of William C. Heller, Jr., and Donald W. Davis, a windowed packaging material is provided wherein a base sheet which, except for chemical treatments, calendering or the like, is uncoated is provided with window openings which are then each covered with a window sheet secured to the base sheet around the window openings with both the window sheets and the base sheet then being covered with a continuous unbroken film. The packaging material of this copending application likewise lends itself to high speed production while being especially adaptable to the formation of the packages from stock which is devoid of extrusion coatings or the like. However, separate sheets are again used for covering the window areas.

The present invention contemplates the provision of a packaging material for forming windowed cartons or the like wherein the use of a separate window covering sheet as such is eliminated and the window closure is formed by the coating material per se which covers the voids in the window areas. The window coverings are thus formed in and by the coating operation per se whether it be an extrusion or other type of coating operation, and provision may be made for introducing such additional amounts of the coating material to the voids in the window areas as to substantially completely fill such voids so that the final composite sheet may be of substantially uniform thickness throughout.

These and other objects and advantages of the invention will become apparent from the following detailed description.

A clear conception of the improved method of and apparatus for producing packaging materials and windowed containers and of the construction and utilization of leakproof containers produced in accordance with the invention may be had by referring to the drawings accompanying and forming a part of this specification wherein like reference characters designate the same or similar parts in the various views.

FIGURE 1 is a diagrammatic view illustrating typical apparatus and the several steps of the production method of the invention wherein an extrusion coater is utilized for applying the transparent overcoating and for filling the window areas in the base sheet;

FIGURE 2 is a fragmentary perspective view of typical equipment for tapering the bounding edges of the window openings formed in predetermined areas of the base sheet prior to the coating operation;

FIGURE 3 is an enlarged fragmentary section of the edge compressing roll of FIGURE 2;

FIGURE 4 is a fragmentary perspective view of one type of coater which may be advantageously used in the performance of the improved method;

FIGURE 5 is a plan view of a fragment of the web of packaging material within the area 5 of FIGURE 1;

FIGURE 6 is a similar plan view of a fragment of the web within the area 6 of FIGURE 1;

FIGURE 7 is still another plan view of one of the finished cut and scored carton blanks embodying the invention;

FIGURE 8 is a fragmentary transverse section through the composite final sheet within windowed areas thereof showing the coating material as applied to only a single side of the base sheet and with the window forming voids of the base sheet filled with the coating material;

FIGURE 9 is a similar fragmentary transverse section through a final composite sheet which has been coated on both sides thereof; and FIGURE 10 is a perspective view of a final assembled carton embodying the invention.

While the invention has been shown and described herein as being especially applicable to a paperboard carton for liquid commodities or the like, and to the production of such specific type of carton which is illustrated herein as being scored and folded in a particular manner and as being provided with window openings in specific areas, it is not intended or desired to thereby unnecessarily limit the invention by reason of such limited embodiments. It is also contemplated that certain descriptive terminology such as "packaging material," "packaging wrapper," and "coating material" as used herein shall be given the broadest possible interpretation consistent with the disclosure.

Referring first to FIGURE 1 of the drawings, the numeral 10 is used to generally designate the supply station for the continuous web of paperboard stock or the like used as the base sheet in the formation of the improved wrappers or containers. The paperboard stock forming the base sheet may, of course, be selected according to the intended use of the wrappers or containers being produced, and while the web forming the base sheet may be chemically treated, calendered, or the like in accordance with customary commercial practice, it is generally uncoated.

In the production of packaging materials embodying the present invention, the web 12 is withdrawn from the supply roll 11 about a series of idler or guide rolls 13 to a printing station or press, generally designated by the numeral 15, which may be of the flexograph or other suitable type having a series of printing rollers 16 and backup rollers 17 all of which are suitably supported in a known manner. At the printing station 15, the surface of the web 12 which is ultimately to become the outer or exterior surface of the wrapper or carton is provided with the desired indicia applied in accordance with accepted commercial practice.

The web 12 is then advanced from the press or printing station 15 through a dryer or oven, generally designated by the numeral 20. The dryer which is likewise illustrated diagrammatically may be of any well known construction such as those commercially used in drying printed surfaces of an advancing web. The printed web 12 is advanced through the dryer 20 over a series of spaced rollers 21 or the like located within a heated jacket or hood 22. As the web leaves the drying zone 20, it is advanced in a customary manner in surface contact about one or more chill rolls 23 preferably arranged in offset relation as shown in order to cool both sides of the advancing web.

As the printed web 12 is advanced beyond the chill rolls 23, it is guided through a cutting station, generally designated by the numeral 25, wherein the window or sight openings are cut to form voids in predetermined areas of the web. Since these cutters are well known in the art, the rotary dies for cutting the window openings are again depicted diagrammatically. As diagrammatically illustrated, the cutter generally comprises a male die or roll 26 and a mating roll 27 both of which are geared and timed with the printing press. At this cutting station, the windows of any desired configuration are defined by cutting the same in predetermined areas of the advancing printed web 12, and these windows may obviously be located as desired so as to ultimately be positioned in any one or more of the walls of the final package, including the top, bottom or sidewalls as well as any gusset panels or the like.

The method and apparatus thus far described is also utilized in the aforementioned copending application of William C. Heller, Jr. and Donald W. Davis. However, the subsequent application of a separate window covering sheet is eliminated in the present invention with the window covering being formed directly by the material used for coating the base sheet, and two distinct problems are thus presented in the present instance. First, when the coating material is applied to the base sheet by extrusion or other coating, the nip pressure between the pressure rollers tends to weaken the coating film along the edges of the base sheet as the coating material is pressed into the window cavity or void by the combined pressure rolls, and this is especially true in areas wherein there is a sharp bounding edge. Furthermore, presently available coating apparatus do not make provision for extrusion of additional materials in predetermined areas but rather supplies a curtain of material of substantially uniform thickness to the sheet being coated, and the thickness of the curtain is normally inadequate to serve as a closure for the window in the relatively heavy stock forming the base sheet.

Therefore, in accordance with the present invention, provision is made for tapering the base sheet along the bounding edges of the window forming voids by next passing the web 12 containing the diecut windows formed at the station 25 through an edge tapering station, generally indicated by the numeral 30. As shown, this station may be provided with cooperating compression rolls 31, 32 the compression die roll 31 of which is provided with embossed surface areas or raised lands 33. The compression roll 31 is indexed with the cutting die or roll 26, and the raised areas 33 on the roll 31 are designed to supply suitable nip pressure along the bounding edges of the window areas formed in the base sheet or web 12 to compress these edges to form tapered bounding edges in the base sheet at the bounding edges of the window areas. This serves to reduce the nip pressure and shearing or cutting tendency along the window edges during the subsequent coating operation and tends to retain continuity of the coating film at these areas.

The web 12 is advanced from the compression zone 30 to extrusion coating station, generally designated by the numeral 35 in the embodiment of FIGURE 1. At the extrusion station 35, a suitable coating material is extruded in a curtain 36 from the extrusion die 37 to the surface of the web 12, the die being fed by the usual screw extruders 38 as well as by a suitable number of auxiliary screw extruders 39 operating at a timed rate indexed to the rate of advancement of the web 12 and the window openings formed therein at the station 25. The auxiliary screw extruders 39 thus deliver additional quantities of the coating material for use in filling the voids formed in the web or base sheet 12, the curtain 36 feeding the web 12 as it passes into the nip formed between a backup roll 41 and a chill roll 42. The extruded curtain 36 of coating material is thus spread with substantial uniform thickness over the surface of the web or base sheet 12 with the voids formed by the windows or sight openings being substantially filled with the additional material fed to the extrusion die by the auxiliary screw extruders 39.

If only one side of the web 12 is to be coated, the composite web can be fed from the extrusion station 35 directly to a final cutting and scoring station 60 wherein a cutting and scoring die 61 operating in conjunction with a mating die 62 severs the web into successive individual blanks 65 which may be suitably stacked as at 66. However, if it is desired to coat both sides of the web 12, the web is advanced beyond the chill roll 42 over a series of guide rolls 45 to a second extrusion station 47 which includes an extrusion die 48 from which a curtain 49 of extruded material is supplied to the other side of web 12 as it enters the nip formed between a pressure roll 51 and a chill roll 52, the curtain of extruded material 49 supplied from the die 48 at the extrusion station 47 being of substantially uniform thickness throughout as distinguished from the extruded curtain 36 at station 35, and while no auxiliary extruder has been shown at the second station 47, it may be found advantageous or desirable in some instances to provide such auxiliary extruder in this zone. From the extrusion station 47, the composite web is then drawn over a series of guide rolls 54 to the final cutting and scoring station 60 as aforesaid.

The extrusion coater diagrammatically depicted in FIGURE 1 will be better understood by referring to the typical coater shown in FIGURE 4 wherein the extrusion die 77 receives a supply of the coating material from feeders 78, 79 for supplying a curtain 76 of the material to the nip formed between the coating backup roll 41 and chill roll 42. The coating material is fed to the die 77 by the usual material feeder 78, but as distinguished from conventional extrusion coaters, auxiliary feeders 79 are provided for delivering additional quantities of the coating material to the curtain 76 in the general areas of the voids formed by the window openings 85 in the base sheet or web 12. These auxiliary feeders 79 are adapted to be operated at a timed rate indexed to the rate of advancement of the web 12 and may take the form of booster cylinders 80 interposed between the auxiliary supply means 79 and the reservoir or die 77. As shown, each booster cylinder has a reciprocating piston 81 therein operated by a timed cam 82 or the like, the auxiliary feeders thus imposing a pulsed flow of coating material to the die and indexed as above indicated to be registered with the window openings. It should of course be understood that other means for adjusting the flow of additional material to the voids in the base sheet may be employed.

The material selected for the coating of the base sheet may be of a type having the necessary protective and strength properties capable of being applied as by an extrusion coating operation, and examples of presently available materials are polyethylene, polypropylene, ethylene-vinyl acetate co-polymers, polyurethane or the like. In addition, the auxiliary or booster cylinders may be supplied with coating materials which are modified as by the addition of rubber to provide the necessary strength to the window areas, and specific examples of suitable materials which are compatible with and may be used in such manner in the window areas are poly-isobutylene and ethylene vinyl acetate co-polymers. Also, the material supplied by the auxiliary feeders may be of greater density than those supplied by the customary extrusion die. As a specific example in which a coating material such as a polyethylene is used for the window covering, the auxiliary flow of the coating material may be adjusted to provide a window film having a thickness in the range of 1–8 mils. as required and/or desired in order to give the necessary window film strength. In such cases, sufficient material may, for example, be fed to the window voids 85 to completely fill the same and provide a composite sheet of substantially uniform thickness throughout. The coating may be applied to either side of the web 12 or to both sides thereof as desired and required, and in order to avoid sticking of the coating material within the window areas wherein the material is of greater thickness than the covering of the sheet 12, the additional heat at these areas may be removed as by means of cold air jets impinged on the rolls 41, 42 at the proper locations or by means of water cooled chill rolls which are adapted to run in contact with the rolls 41, 42 within the areas of higher temperatures. Also, the polyethylene or other coating material fed to the die from the auxiliary extruders 39 or the auxiliary feeders 79, 80 may be of medium to high density polyethylene as, for example, in the range of 0.935 to 0.96. This would provide additional strength and stiffness to the film in the window areas and would contribute to the uniform strength and rigidity of the carton, thus minimizing the danger of window distortion or breaking.

It is apparent from the foregoing that the web 12 in the area 5 of FIGURE 1 consists solely of the base sheet or web 12 provided with window openings or voids 85 defined at predetermined spaced localities, the bounding marginal edges of the voids 85 being tapered as at 86. Thus, after the web has left the coating station 35 one of the surfaces thereof is covered with a coating or film 87, the composite web in the area 6 of FIGURE 1 being shown in FIGURE 6. In addition to the film coating 87, the window voids 85 are substantially completely filled with the coating material and the composite sheet is of substantially uniform thickness throughout. After cutting and scoring, the carton blanks 65 formed from the composite web 12 are in flat condition as illustrated in FIGURE 7 with the carton walls being defined by score lines 89. The final packaging wrapper accordingly comprises a base sheet 12 having sight openings 85 formed in predetermined areas thereof with a continuous film 87 adhered to at least one side of the base sheet and extending completely over the sight openings. The film is of substantially uniform thickness over the areas which are adhered to the plane surface of the base sheet, and this film is of a greater thickness so as to substantially fill the voids formed by the sight openings within the areas of these openings.

The coating which is applied to the base sheet by the extrusion coater or curtain coater may be of any suitable material capable of being extruded or applied by a curtain coating process, and it should be understood that the base sheet may or may not be supplied with printing on either one or both sides thereof as desired. It is, of course, apparent that in order to serve its intended purpose and permit viewing of the contents in the final package shown in assembled condition in FIGURE 10, the coating material should normally be selected from one which is transparent or semi-transparent or translucent. Also, it should be understood that the final assembled packages or cartons may partake of various configurations and that the window openings may be arranged for disposition in any desired locality or areas. The means illustrated for tapering the edges of the window openings is meant to serve merely as an example, and it should be understood that these edges may be tapered as by skiving, trimming, grinding operations or the like, and the reference to tapering of the edges should be understood to include a rounding, indentation or similar operation which reduces or eliminates the sharp edges normally resulting from a cutting operation. Furthermore, while the invention has been shown as being performed in a continuous in line operation, it may obviously be carried out in separate and/or discontinuous operations or a combination thereof.

Various modes of carrying out the invention are contemplated as being within the scope of the following claims particularly pointing out and distinctly claiming the subject matter that is regarded as the invention:

We claim:

1. The method of preparing a packaging material for use in forming containers which comprises, initially removing predetermined areas of a base sheet to form openings therein, and thereafter coating at least one side of the base sheet with a continuous film adhered to the base sheet while simultaneously covering the voids formed by the openings with a greater thickness of the coating material than on said base sheet to thereby provide a composite sheet.

2. The method of preparing a packaging material according to claim 1, wherein the voids are completely filled to provide a composite sheet of substantially uniform thickness throughout.

3. The method of preparing a packaging material according to claim 1, wherein both sides of the base sheet are coated with a continuous film adhered thereto.

4. The method of preparing a packaging materal according to claim 1, wherein the bounding edges of the openings formed in the base sheet are tapered prior to the coating operation.

5. The method of preparing a packaging material according to claim 4, werein the bounding edges of the openings are tapered by compression.

6. The method of preparing a packaging material according to claim 1, wherein the coating of the base sheet and the simultaneous covering of the voids is performed by an extrusion operation.

7. The method of preparing a packaging material according to claim 1, wherein the base sheet is in the form of a continuous web which is longitudinally advanced through the initial opening forming zone and the coating zone, and the composite web is subsequently scored and severed into successive individual blanks.

8. A packaging wrapper comprising, a base sheet having through openings formed in predetermined areas thereof, and a continuous film of coating material adhered to at least one side of the base sheet and extending completely over the openings therein to provide the sole covering for the openings, the coating material within the area of the openings being of greater thickness than the coating adhered to said base sheet.

9. A packaging wrapper according to claim 8, wherein the film is of substantially uniform thickness over the areas thereof which are adhered to the base sheet and is of a greater thickness so as to substantially fill the voids formed by the openings in the base sheet within the areas of the openings.

10. A packaging wrapper according to claim 8, wherein both sides of the base sheet are provided with a continuous film adhered thereto and the composite sheet is of substantially uniform thickness throughout.

11. A packaging wrapper according to claim 8, wherein the bounding edges of the openings are tapered.

12. A packaging wrapper according to claim 8, wherein the coating material in the areas of the voids formed by the openings in the base sheet possesses different properties than the coating material adhered to the base sheet.

13. Apparatus for forming a composite sheet of material comprising, means for advancing a base sheet, means for removing predetermined areas of said base sheet to provide voids therein, coating means for supplying a curtain of coating material of substantially uniform thickness over a side of said base sheet as it is advanced, and means for feeding additional amounts of the coating material to the voids formed in said base sheet in timed relation with its advancement.

14. Apparatus for forming a composite sheet of packaging material according to claim 13, wherein the coating means has the curtain forming die thereof provided with auxiliary feed ports positioned in alignment with the voids formed in the base sheet and provided with feeding means operating in timed relation with the advancement of the base sheet for feeding the additional amounts of material to the curtain of material supplied to the base sheet.

15. Apparatus for forming a composite sheet of packaging material according to claim 13, wherein means is additionally provided for applying substantially uniform pressure to the composite sheet as it is advanced beyond the coating and void filling zone.

16. Apparatus for forming a composite sheet of packaging material according to claim 13, wherein means is provided for tapering the bounding edges of the voids formed in the base sheet.

17. Apparatus for forming a composite sheet of packaging material according to claim 16, wherein the means for tapering the bounding edges of the base sheet is a pressure applying device for compressing the edges as the base sheet is advanced.

References Cited

UNITED STATES PATENTS

| 2,218,246 | 10/1940 | McGrady | 206—45.33 |
| 2,715,089 | 8/1955 | Michener et al. | 156—108 X |
| 3,024,147 | 3/1962 | Brooks et al. | 161—114 |
| 3,280,847 | 10/1966 | Chisholm et al. | 264—167 X |
| 3,312,766 | 4/1967 | Stevens | 264—167 |
| 3,336,845 | 8/1967 | Lepisto et al. | 156—514 X |

FOREIGN PATENTS

| 641,568 | 8/1950 | Great Britain. |

EARL M. BERGERT, Primary Examiner

T. R. SAVOIE, Assistant Examiner

U.S. Cl. X.R.

18—14; 156—108, 244, 256, 500, 514; 206—45; 229—3; 264—167